Nov. 10, 1942.   W. HÄCKER   2,301,397
AUTOMOBILE AERIAL ROD FITTING
Filed March 22, 1939
Fig. 1.
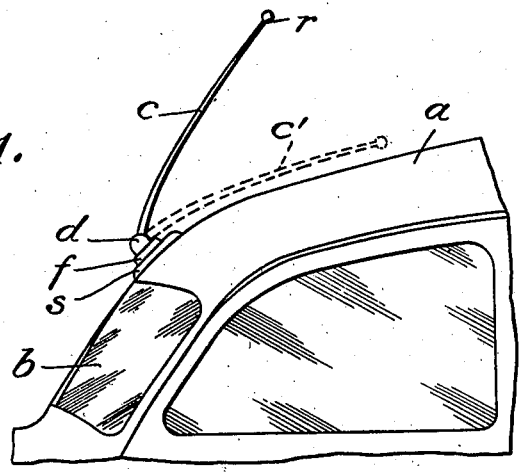
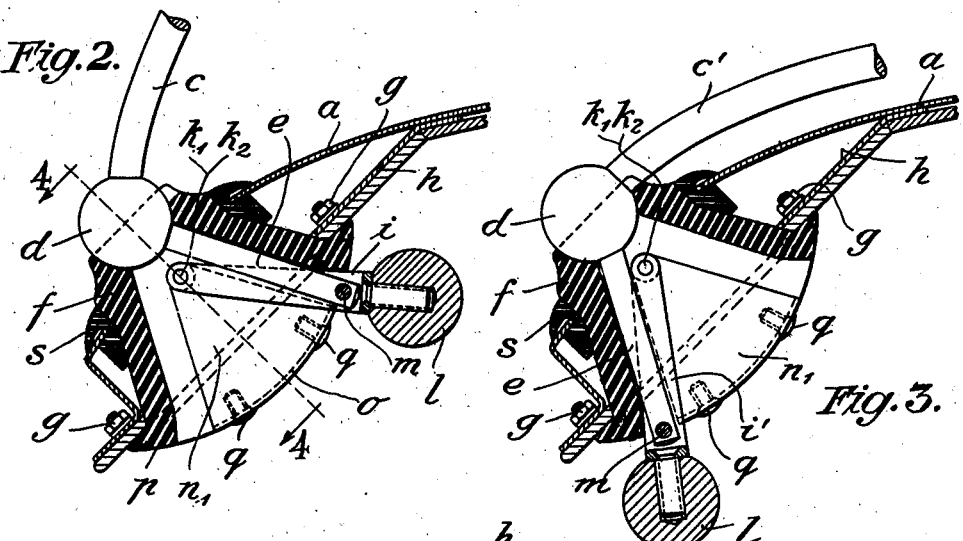
Fig. 2.   Fig. 3.
Fig. 4.
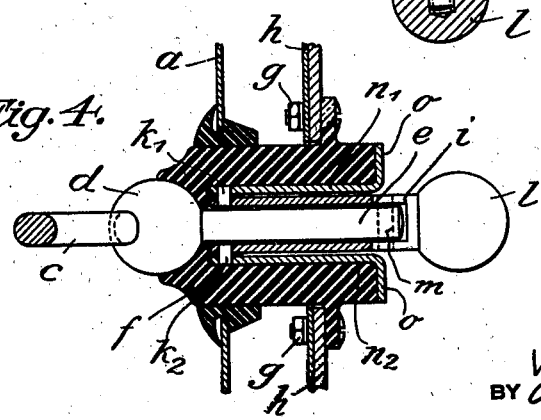
INVENTOR
WALTER HÄCKER
BY
ATTORNEYS Patented Nov. 10, 1942

2,301,397

UNITED STATES PATENT OFFICE 2,301,397

AUTOMOBILE AERIAL ROD FITTING

Walter Häcker, Sindelfingen, Germany; vested in the Alien Property Custodian

Application March 22, 1939, Serial No. 263,465
In Germany March 23, 1938

17 Claims. (Cl. 250—33)

The invention relates to a rod aerial, swingable from the interior of an automobile for the reception therein of wireless transmissions.

One object of the invention is to provide an aerial rod which is swingable about a substantially horizontal axis extending transversely of the direction of travel and to extend such rod beyond its pivot situated near the exterior of the vehicle, the said extension to be accessible from the interior of the vehicle, for use as an operating lever for raising or lowering the aerial at will and to be secured resiliently in one position or the other.

A further object is to provide a resilient securing device for the aerial rod adapted for permitting such rod to yield rearwardly and downwardly should it encounter an obstruction.

Further objects relate to the mounting of the aerial on the vehicle body and to means for swinging the aerial into the reception position and back to the position of rest, as will appear from the following description of a constructional example illustrated in the annexed drawing wherein—

Figure 1 is a side elevation of the front end of the roof of a vehicle body with the novel aerial fitting.

Figure 2 is a longitudinal section to a larger scale of the aerial on the vehicle body in effective position.

Figure 3 is a longitudinal section showing the aerial lowered or in the position of rest, and Figure 4 is a sectional plan the section being taken on the line 4—4 in Figure 2.

At the front end of the roof $a$ of the sheet metal vehicle body and closely above the windshield $b$ is mounted the swingable rod aerial $c$ which assumes the position $c^1$ in the position of rest. The aerial rod terminates below in a bearing element such as the ball $d$ to which an arm $e$ is connected on the side towards the interior of the vehicle. The ball $d$ is rotatably mounted for movement about a horizontal transverse axis in a ball socket of a housing $f$. The housing is produced from a solid, but still comparatively elastic, electrically insulating material, for example of rubber or a suitable pressed artificial resin and is rigidly connected by screws $g$ to the inner metal sheet $h$ of the roof of the vehicle. The outer roof sheet $a$ has a corresponding opening through which the housing $f$ is inserted from the inside and against whose edge it is sealed by a profiled ring $s$ of soft rubber.

A lever $i$, which is shown as of U-shape in plan view, is swingable about pivots $k_1$, $k_2$ in the interior of the housing. At its end projecting from the housing, the lever $i$ carries an operating knob $l$ and is also pivotally connected by a pin $m$ to the free end of the arm $e$. The swinging pivots $k_1$, $k_2$ of the lever $i$ are not mounted directly in the wall of the housing $f$, but are mounted in angle-shaped sheet-metal members $n_1$, $n_2$, which bear with their flanges $o$ against the circularly bent inner edge $p$ of the housing and are there rigidly connected to the housing by screws $q$.

The whole arrangement is so made that the ball-shaped knob $d$ is constantly pressed against its bearing surface at the front end of the housing by the lever $i$ through the intermediation of the arm $e$ and utilising the elasticity of the housing $f$, so that penetration of water into the housing is prevented and any mechanical vibrations of the aerial are effectively damped.

It will be immediately evident from Figure 2, that the force with which the housing is elastically compressed between the ball-shaped knob $d$ and the flanges $o$ will increase as the lever $i$ approaches from the receiving position shown in Figure 2 to the middle position which is indicated by the line 4—4, since the knob $d$ and the lever $i$ swing about different centres of rotation. When the line 4—4 has been passed, the force of the resilient housing acting upon the lever $i$, again decreases until the position of rest $c^1$ is reached. Since this force acts upon the lever $i$ in different directions on rotation above and below the line 4—4, the lever and, with it, the aerial, when it is moved upwardly or downwardly beyond the line 4—4, passes of its own accord into the receiving position or the position of rest respectively and is elastically secured in or biased towards this position in each case.

It follows that, in spite of the very simple construction, it is possible to move the aerial quickly and in very simple fashion at any time. No rattling noises due to vibration arising during driving can be produced, since the whole arrangement is constantly subject to spring force. It will now also be clear why the swinging pivots $k_1$, $k_2$, are mounted not directly in the wall of the housing, but in the sheet-metal members $n_1$, $n_2$, mounted on the inner end $p$ of the housing, since the elasticity of the material of the housing can be utilised to its full extent in this fashion.

If the aerial, in the receiving position, encounters an obstruction situated above the path of travel, then it swings rearwardly and downwardly elastically about the ball $d$, whereupon, as long as the lever $i$ does not pass the line 4—4, it automatically re-erects itself after passing beneath the obstruction. Attached to the tip of the aerial is a guard button *r* of soft rubber or the like which prevents the aerial from striking hard against the roof of the vehicle and possibly damaging the paint-work if the aerial moves suddenly into the position of rest. The rod aerial is connected to the aerial socket of the receiver, situated in the vehicle, in known fashion not illustrated here.

The invention is not intended to be limited to the form shown, which is to be understood as illustrative only and not as limiting, as various changes in construction and arrangement may be made, all coming within the scope of the claims which follow.

I claim:

1. Automobile aerial rod fitting, comprising a pivot at one end of the rod adapted to be attached to an automobile, an operating arm extending from said pivot so as to be operative from within said automobile for raising or lowering said aerial rod, and a resilient compressible device mounted on said automobile, journaling said pivot and interconnected with said arm for holding said aerial rod in either the raised or lowered position.

2. Automobile aerial rod fitting, comprising a pivot attached to and movable in the same direction with one end of said rod, a socket seating said pivot and adaptable to an automobile, an operating arm extending from said pivot so as to be operative from within said automobile for raising and lowering said rod, said socket being formed as a resilient compressible device interconnected with said arm for holding said aerial rod in either the raised or lowered position.

3. Automobile aerial rod fitting comprising at one end of the rod a pivot, a socket seating said pivot and attachable to an automobile, an operating arm extending from said pivot so as to be operative from within said automobile for raising and lowering said aerial rod, resilient means operative for securing said aerial rod in either the raised or lowered position, and an operating hand lever pivotally mounted off-centre from but near to said pivot and pivotally connected with said arm at a point distant from said pivot.

4. Automobile aerial rod fitting comprising at one end of the rod a pivot, a resilient hollow body supporting and seating said pivot and attachable to an automobile, an operating arm extending from said pivot through said hollow body, and means operatively connected with said arm and with said hollow body for moving against the resilience of said body in the swinging of said arm to raise and lower said rod through said pivot and hold the same in either its raised or lowered position.

5. Automobile aerial rod fitting comprising at one end a pivot, a hollow body of resilient material attachable to an automobile and comprising in a unitary structure a spherical seating for said pivot and a support for said seating, an operating arm extending from said pivot through said hollow body, and means operatively connected with said arm and with said hollow resilient body for moving against the resilience of said body in the swinging of said arm to raise and lower said rod through said pivot and hold the same in either its raised or lowered position.

6. Automobile aerial rod fitting comprising at one end a ball pivot, a hollow body of resilient material attachable to an automobile and providing a seating for said ball pivot and a support for said seating, an operating arm extending from said ball pivot through the hollow of said body, metal walls inserted into said body from one end, a hand lever swingable within said body and pivoted to said plates near to said ball pivot, and a pivotal connection between said hand lever and said operating arm at a point distant from said ball pivot.

7. The combination according to claim 1, in combination with a resilient guard knob mounted upon the other end of said rod for preventing contact of said rod with said automobile when the rod is in its lowered position.

8. Automobile aerial rod fitting, comprising, in combination, an aerial rod, operating means within said automobile for swinging said aerial rod from a lowered to a raised position, and vice versa, and resilient means for supporting said operating means and biasing the same away from mid-position and toward one extreme position or the other.

9. Automobile aerial rod fitting comprising an aerial rod swingable about a weather-tight pivot, operating means accessible from within the automobile and comprising a dead-centre lever system connected with said pivot, and resilient means variably stressed by said lever system when operated for raising or lowering the said rod.

10. Automobile aerial rod fitting comprising a resilient support member attached to an automobile body adjacent to an opening therein, an aerial rod pivotally attached to said support for movement about a generally horizontal axis transverse to said body, an operating arm connected with said aerial rod and extending through said opening into the interior of the automobile body, whereby said aerial rod may be oscillated about its pivot from within the automobile body, and means including said resilient support member, operable upon said operating arm for securing said aerial rod in the position to which it has been oscillated.

11. Automobile aerial rod fitting comprising a resilient support member attached to an automobile body adjacent to an opening therein, an aerial rod pivotally attached to said support for movement about a generally horizontal axis transverse to said body, an operating arm connected with said aerial rod and extending through said opening into the interior of the automobile body, whereby said aerial rod may be oscillated about its pivot from within the automobile body from a generally upright effective position to a position adjacent the exterior surface of the automobile body, and means including said resilient supporting member, operable upon said operating arm for securing said aerial rod in the position to which it has been oscillated.

12. Automobile aerial rod fitting comprising a resilient support member attached to an automobile body adjacent to an opening therein, an aerial rod pivotally attached to said support for movement about a generally horizontal axis transverse to said body, an operating arm connected with said aerial rod and extending through said opening into the interior of the automobile body, whereby said aerial rod may be oscillated about its pivot from within the automobile body from a generally upright effective position to a position where the aerial rod extends rearwardly into close juxtaposition with the top surface of the automobile body, and means including said resilient supporting member for securing said aerial rod in the position to which it has been oscillated.

13. The combination according to claim 10, in which said support is a rubber housing journaling said aerial rod at one end and extending within said opening to form resilient abutments for limiting the motion of said operating arm.

14. In a vehicle, an aerial rod having a pivot at one end thereof, a vehicle body having an opening therein, an arm connected to said pivot and extending through said opening into said body for raising and lowering said rod, and resilient means in said opening cooperating with said arm to journal said pivot and secure it in its raised or lowered position.

15. In an automobile having an opening in its roof, the combination of an aerial rod provided with a pivot directly attached to and movable in the same direction with one end of said rod, and mounted in said opening, an operating arm connected to said pivot and extending through said opening into the automobile for raising and lowering said rod from a substantially vertical position to a relatively horizontal position adjacent said roof, a resilient guard on the free end of said aerial rod for preventing contact of said rod with said roof in its lowered position, and resilient means in said opening for securing said rod in its raised or lowered position.

16. The combination according to claim 2, in which said pivot is a ball pivot and said socket is a ball socket seating said ball pivot.

17. The combination according to claim 8, in combination with a resilient guard knob mounted upon the free end of said aerial rod for preventing contact of said rod with said automobile when said operating means and said resilient biasing means urges said rod to its lowest position.

WALTER HÄCKER.